(12) United States Patent
Cady et al.

(10) Patent No.: US 10,137,389 B2
(45) Date of Patent: Nov. 27, 2018

(54) HIGH CAPACITY FILTERING SCREEN

(71) Applicants: M-I L.L.C., Houston, TX (US);
UNITED WIRE LIMITED UK LIMITED, Aberdeen (GB)

(72) Inventors: Eric Cady, Walton, KY (US); Graham Alexander Robertson, Edinburgh (GB); LaTosha Moore, Richmond, TX (US); Claire Rosaleen Galloway McLean, Westhill (GB); Andrew Ralph, Longniddry (GB)

(73) Assignees: M-I L.L.C., Houston, TX (US); M-I Drilling Fluids UK Ltd., Aberdeen (GB)

(*) Notice: Subject to any disclaimer, the term of this patent is extended or adjusted under 35 U.S.C. 154(b) by 363 days.

(21) Appl. No.: 14/892,944

(22) PCT Filed: Dec. 10, 2014

(86) PCT No.: PCT/US2014/069604
§ 371 (c)(1),
(2) Date: Nov. 20, 2015

(87) PCT Pub. No.: WO2015/089223
PCT Pub. Date: Jun. 18, 2015

(65) Prior Publication Data
US 2016/0101377 A1 Apr. 14, 2016

Related U.S. Application Data

(60) Provisional application No. 61/914,224, filed on Dec. 10, 2013.

(51) Int. Cl.
*B01D 29/05* (2006.01)
*B07B 1/46* (2006.01)
(Continued)

(52) U.S. Cl.
CPC ........... *B01D 29/05* (2013.01); *B01D 29/012* (2013.01); *B01D 29/56* (2013.01); *B07B 1/4636* (2013.01);
(Continued)

(58) Field of Classification Search
CPC . B07B 1/4636; B07B 1/4645; B07B 2201/04; B07B 1/46; B07B 1/4609; B01D 29/05; B01D 29/012; B01D 29/56
See application file for complete search history.

(56) References Cited

U.S. PATENT DOCUMENTS 4,929,346 A    5/1990  Si-Lin
5,950,841 A *  9/1999  Knox .................... B07B 1/4663
                                                     209/315

(Continued)

FOREIGN PATENT DOCUMENTS

CN      201632414 U    11/2010
WO      2008/042856 A1  4/2008

OTHER PUBLICATIONS

International Search Report and the Written Opinion for the equivalent PCT patent application PCT/US2014/069604 dated Mar. 31, 2015.

*Primary Examiner* — Robert Clemente
(74) *Attorney, Agent, or Firm* — Paula B. Whitten (57) ABSTRACT

A filtering assembly includes a screen housing having two sidewalls and two end walls, defining a perimeter with a length and a width. The screen housing also includes a top face and a bottom face. A plurality of screen segments are positioned on the top face of the screen housing, such that the plurality of screen segments on the top face provide a screening surface area less than a total surface area of the top face, and a plurality of screen segments are positioned on the bottom face of the screen housing, such that the plurality of screen segments on the bottom face provide a screening (Continued)

surface area less than a total surface area of the bottom face. A total screening surface area of the filtering assembly is greater than the total surface area of the top face.

14 Claims, 11 Drawing Sheets (51) Int. Cl.
*B01D 29/01* (2006.01)
*B01D 29/56* (2006.01)
(52) U.S. Cl.
CPC ........ *B07B 1/4645* (2013.01); *B07B 2201/04* (2013.01)

(56) References Cited

U.S. PATENT DOCUMENTS

| | | |
|---|---|---|
| 6,269,953 B1 | 8/2001 | Seyffert et al. |
| 6,675,975 B1 | 1/2004 | Cook et al. |
| 2002/0000399 A1 | 1/2002 | Winkler et al. |
| 2008/0078702 A1 | 4/2008 | Carr et al. |
| 2015/0158054 A1 | 6/2015 | Cady |

\* cited by examiner

HIGH CAPACITY FILTERING SCREEN

This Application claims priority to application Ser. No. 61/914,224 filed on Dec. 10, 2013, in the United States.

BACKGROUND

Vibratory separators are used to separate solid particulates of different sizes and/or to separate solid particulate from fluids. Vibratory separators are used in the oil and gas industry, food industry, cleaning industry, waste water treatment, and others. For example, vibratory separators, or shale shakers, used in the oil and gas industry are used to remove cuttings and other solid particulates from drilling mud returned from a wellbore. A shale shaker is a vibrating sieve-like table upon which returning used drilling mud is deposited and through which substantially cleaner drilling mud emerges. The shale shaker may be an angled table with a generally perforated filter screen bottom. Returning drilling mud is deposited at one end of the shale shaker. As the drilling mud travels toward the opposite end, the fluid falls through the perforations to a reservoir below, thereby leaving the solid particulate material behind.

The size of a shaker screen may be pre-determined by the size of the shaker basket which is generally determined by the size of the shaker footprint. It may be desirable to maximize the amount of fluid capacity that a shaker has (i.e., the number of gallons/minute of drilling fluid/mud that a shaker can process). The higher fluid capacity a shaker has, the fewer shakers and screens may be used to maintain drilling operations. Because the size of the screen is often pre-determined, the screening area of a two dimensional pre-tensioned screen is generally also pre-determined. For example, the maximum screen area for a 2 foot by 4 foot screen is 8 square feet. In addition, the screen or wire mesh is bonded to the screen frame so that the area of the screen where the wire mesh is bonded becomes blocked off and the effective open or non-blanked screen area is less than 8 square feet, using the example above. The wire mesh may also decrease the non-blanked area so that the effective screening area of the 8 square foot screen may be reduced by more than 50%. Despite many valuable contributions from the art, it would be beneficial to develop systems and methods that efficiently process fluids, including oil-based and water-based return drilling fluids.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Embodiments disclosed herein relate generally to vibratory separators, see for example screens disclosed in International Patent Cooperation Treaty Patent Application Ser. No. PCT/US2013/045249 filed Jun. 11, 2013, and entitled, "Vibratory Separator Screen", and U.S. Provisional Patent Application Ser. No. 61/658,175 filed Jun. 11, 2012, and entitled, "Vibratory Separator Screen", both of which are incorporated in their entirety by reference herein.

In one aspect, embodiments disclosed herein relate to a filtering assembly to be used with a vibratory separator. Specifically, the filtering assembly may provide a screening surface area greater than an area defined by a length and width of the filtering assembly. In another aspect, embodiments disclosed herein may provide a filtering assembly having at least two screening levels. In another aspect, fluid provided to the filtering assembly may be filtered once.

Figure 1:
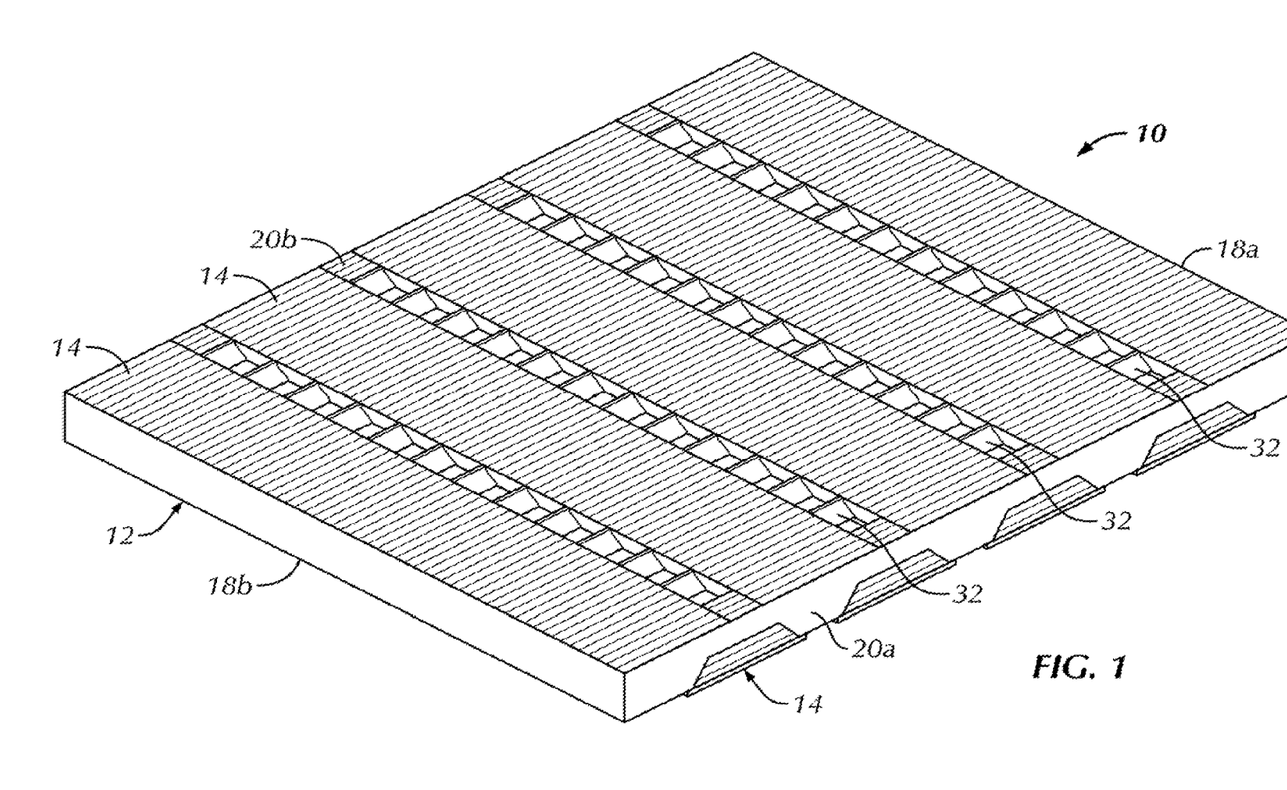
FIG. 1 is a perspective view of a filtering assembly, according to embodiments of the present disclosure.
Figure 2:
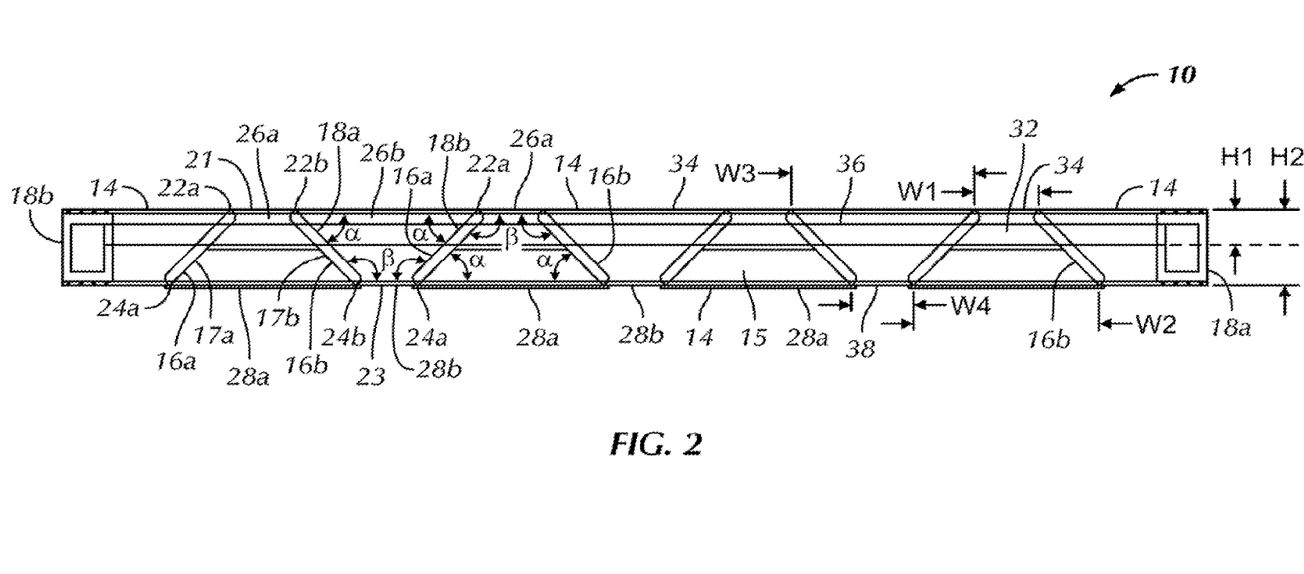
FIG. 2 is a cross-sectional view of the filtering assembly of FIG. 1.

With reference to FIGS. 1 and 2, a filtering assembly constructed in accordance with the present teachings is illustrated and indicated by reference numeral 10. While the filtering assembly 10 is generally described herein with respect to filtering drilling fluid or mud from an oil well, it will be appreciated that the filtering assembly 10 may be operable to filter other materials, including materials from other types of wells or material from the food industry, waste water industry, cleaning industry, etc.

The filtering assembly 10 includes a screen frame or housing 12. At least one screen segment 14 may be located on the housing 12. The housing 12 may be constructed of metal (e.g., steel, aluminum, etc.), thermoset polymeric material, thermoplastic polymeric material, a reinforced composite material, or any other suitable material within the scope of the present teachings. Accordingly, the housing 12 may be manufactured by three dimensional printing, injection molding, casting, extruding, machining or stamping. Some screen embodiments may be constructed using a reinforced composite housing, such as those described in U.S. Pat. No. 6,675,975 (incorporated herein by reference), or any other like or suitable composite designs.

The housing 12 may be attached to a frame of a vibratory separator (not shown) as will be understood by one of ordinary skill in the art. The housing 12 includes first and second side walls 20a and 20b and first and second end walls 18a and 18b. The first and second sidewalls 20a, 20b and the first and second end walls 18a, 18b define a perimeter of the housing 12. The first and second sidewalls 20a, 20b may span a length of the housing 12 and the first and second end walls 18a, 18b may span a width of the housing 12.

The housing 12 also has a top face 21 and a bottom face 23. A profile of the top and bottom faces 21, 23 may be planar, U-shaped (e.g., concave or convex), sinusoidal, or any other suitable configuration within the scope of the present disclosure, such that the topography of the upper and lower sides are optimum for the flow and treatment of fluid therethrough. As illustrated in FIGS. 1 and 2, the profiles of the top and bottom face 21, 23 are planar.

The housing 12 may include a plurality of transverse ribs collectively indicated by the reference numeral 16. The plurality of transverse ribs 16 may be arranged in pairs such that the housing includes at least one pair of transverse ribs, for example, first transverse rib 16a and second transverse rib 16b. The ribs 16 may span a width of the housing 12 such that each transverse rib 16a, 16b extends laterally between the first and second side walls 20a, 20b of the housing. Each transverse rib 16a, 16b includes an upper edge 22a, 22b and a lower edge 24a, 24b. The upper edge 22 may extend to the top face 21 and the lower edge 24 may extend to the bottom face 23.

Referring to FIG. 2, the plurality of transverse ribs 16 may be arranged such that, when viewed from a longitudinal cross section, adjacent transverse ribs, e.g., first rib 16a and second rib 16b are positioned to have opposing side-faces 17a and 17b, respectively, facing each other. The opposing side-faces 17a, 17b form an acute angle α with one of the top or bottom face of the housing 12. For example, as illustrated in FIG. 2, opposing side-faces 17a and 17b of two adjacent, consecutive ribs 16a, 16b form an acute angle α with the bottom face 23 of the housing 12. Opposing side-faces 18a and 18b of the next two adjacent, consecutive ribs 16b, 16a, respectively, (i.e., such that side-faces 17b and 18a are located on opposite side-faces of rib 16b) form an acute angle α with the top face 21 of the housing 12.

On the opposite face of the housing 12 (i.e., if angle α is formed with a bottom surface 23, the opposite surface will be the top surface 21) the opposing side-faces 17a and 17b will from an obtuse angle β with said opposite face of the housing 12. For example, as illustrated in FIG. 2, opposing side-faces 17a and 17b of adjacent ribs 16a, 16b form an obtuse angle β with the top face 21 of the housing 12. Opposing side-faces 18a and 18b of the next two adjacent, consecutive ribs 16b, 16a, respectively, form an obtuse angle β with the top face 23 of the housing 12.

This configuration may alternate for each consecutive transverse rib, as shown in FIG. 2. In other words, the housing 12 may include an alternating arrangement or pattern of first and second transverse ribs 16a, 16b, such that two adjacent first and second transverse ribs 16a, 16b define an inverted funnel having an inverted truncated V-shape, and the next two adjacent second and first transverse ribs 16b, 16a define a funnel having a truncated V-shape.

In one configuration, the angle α is substantially equal to fifty degrees. It will be appreciated, however, that the angle α may be more or less than fifty degrees. For example, the angle α may be between 30 degrees and 70 degrees. The angle β may be substantially equal to the angle α, plus ninety degrees. In other embodiments, the angles α and β may be supplementary angles. For example, if the top face and bottom face of the housing 12 are planar and parallel, then the angle α and the angle β of each rib are supplementary angles. However, angle α and angle β do not have to be supplementary angles.

The plurality of transverse ribs 16 may define a plurality of openings. Specifically, the plurality of upper edges 22a, 22b of the first and second ribs 16a, 16b, respectively, of each pair of transverse ribs may define first and third openings 26a, 26b and the lower edges 24a, 24b of the first and second ribs 16a, 16b, respectively, of each pair of transverse ribs may define second and fourth openings 28a, 28b. For example, a first opening 26a may be defined by a space located on the top face 21 of the housing 12 between the first rib 16a and the second rib 16b, i.e., between the upper edge 22a and upper edge 22b. A second opening 28a may be defined by a space located on the bottom face 23 between the first rib 16a and the second rib 16b, i.e., between the lower edge 24a and the lower edge 24b. Each pair of ribs is positioned such that a width of the first opening 26a is different from a width of the second opening 28a. As shown in FIG. 2, the width of the first opening 26a is less than the width of the second opening 28a. However, one skilled in the art will understand that the width of the first opening 26a may be greater than the width of the second opening 28a without departing from the scope of the present disclosure.

A third opening 26b may be defined by a space located on the top face 21 of the housing 12 between adjacent pairs of ribs, i.e., between an upper edge 22b of the second rib 16b of a first pair of ribs and an upper edge 22a of a first rib 16a of a second pair of ribs. A fourth opening 28b may be defined by a space located on the bottom face 23 of the housing 12 between adjacent pairs of ribs, i.e., between a lower edge 24b of the second rib 16b of a first pair of ribs and a lower edge 24a of a first rib 16a of a second pair of ribs. Each adjacent pair of ribs is positioned such that a width of the third opening 26b is different from a width of the fourth opening 28b. As shown in FIG. 2, the width of the third opening 26b is greater than the width of the fourth opening 28b. However, one skilled in the art will understand that the width of the first opening 28a may be greater than the width of the second opening 26b without departing from the scope of the present disclosure.

A fifth opening 26a may be defined by a space located on the top face 21 of the screen housing 12 defined by the by a first rib 16a and a second rib 16b of the second pair of adjacent transverse ribs. A sixth opening 28a may be defined by a space located on the bottom face 23 of the screen housing 12 defined by a first rib 16a and a second rib 16b of the second pair of adjacent transverse ribs. As illustrated in FIG. 2, the shape (including width and length) of the fifth and sixth openings 26a, 28a may correspond to the first and second openings 26a, 28a, respectively, such that a width of the fifth opening is different than a width of the sixth opening.

According to some embodiments, a width W1 of the first opening 26a may be approximately equal to a width W4 of the fourth opening 28b, and a width W5 of the fifth opening. A width W2 of the second opening 28a may be approximately equal to a width W3 of the third opening 26b and a width W6 of the sixth opening. In one configuration, the widths W1, W4, and W5 may be substantially equal to four centimeters, and widths W2, W3, and W6 may be substantially equal to eleven centimeters. It will be appreciated, however, that the widths W1, W4, and W5, and the widths W2, W3, and W6, may be more or less than four centimeters and eleven centimeters, respectively, within the scope of the present disclosure.

The housing 12 may include a third rib 32. The third rib 32 may span the length of the housing 12, such that the third rib 32 is a longitudinal rib that extends from the first rib 16a to the second rib 16b, in a direction substantially parallel to the sidewalls 20a, 20b. An upper edge 34 of the third rib 32 may extend to the top face 21 of the housing 12. In one configuration, a height H1 of the third rib 32 may be equal to one-half of a height H2 of the first and second ribs 16a, 16b, although the height of the third rib 32 is not intended to limit the scope of the present disclosure. While the third rib 32 is shown extending in a direction substantially parallel to the sidewalls 20a, 20b, it will also be appreciated that the third rib 32 may extend in other directions from and between the first and second ribs 16a, 16b within the scope of the present teachings. In some embodiments, H2 may be about equal to H1. As illustrated in FIG. 2, the housing 12 includes a plurality of third ribs 32 extending between the first and second ribs 16a, 16b of each rib pair. In some embodiments, the third rib 32 may not extend between adjacent rib pairs.

The housing 12 may also include a fourth rib or rib 36. The fourth rib 36 may extend from the first rib 16a to the second rib 16b, in a direction substantially parallel to the sidewalls 20a, 20b, such that the fourth rib is a longitudinal rib located between adjacent pairs of ribs. A lower edge 38 of the rib 32 may extend from the top face 21 to the bottom face 23 of the housing 12.

The transverse ribs and longitudinal ribs, e.g., first, second, third and fourth ribs 16a, 16b, 32, 36, may be integrally formed with the first and second sidewalls 20a, 20b, such that the housing 12 is a monolithic construct. The dimensions of the first, second, third and fourth ribs 16a, 16b, 32, 36 may be such that the non-blanked surface area of the upper side 21 of the housing 12 is greater than seventy-five percent of the total surface area of the upper side 21 of the housing 12.

In an assembled configuration, the filtering assembly 10 may include a plurality of screen segments 14. The screen segments 14 may be a mesh-like construct. The plurality of screen segments 14 may be positioned across a width between the opposing side-faces 17a, 17b of the adjacent transverse ribs 16a, 16b forming the acute angle α between each of the opposing side-face and a top and bottom face 21, 23. For example, a screen segment 14 may be positioned across the second opening 28a, the third opening 26b, and/or the sixth opening. A screen segment 14 may also be located between each end wall 18a, 18b and an adjacent rib 16. The screen segment 14 will be located on one of either the top or bottom face 21, 23 that forms the acute angle α with the rib adjacent the end wall 18a, 18b. For example, the second, third and sixth openings. The at least one screen segment 14 located on the top face 21 of the housing 12 forms a first screening level and the at least one screen segment 14 located on the bottom face 23 of the housing 12 forms a second screening level, such that the filter assembly 10 includes at least two screening levels.

As illustrated in FIG. 2, with reference to the plurality of openings, at least one screen segment 14 may substantially cover the second opening 28a and at least one screen segment 14 may substantially cover the third opening 26b. A screen segment 14 may cover the opening on a top surface 21 of the housing 12 between the end walls 18a, 18b and an adjacent rib. The screen segments 14 may be alternately located on the top and bottom faces 21, 23 of the housing 12, as shown in FIG. 2. The screen segments 14 may be discrete, i.e., not continuous. While the screen segments 14 are shown as having planar configurations, it will also be appreciated that at least one of the screen segments 14 may be provided in a corrugated configuration on the top and/or bottom faces 21, 23 of the housing 12.

With reference to FIGS. 3-7, another configuration of a filtering assembly 100 is shown. The filtering assembly 100 may include a first housing 112a and a second housing 112b. The first housing 112a may be substantially similar to the housing 12, except as otherwise provided herein. For example, the first housing 112a may include two sidewalls and two end walls, defining a first perimeter with a first length and a first width, a top face, and a bottom face. The first housing 112a may also include a plurality of transverse ribs spanning the first width extending from the top face 21 to the bottom face 23 of the first screen housing 112a. The plurality of transverse ribs 16 may be arranged such that, adjacent transverse ribs 16a, 16b have opposing side-faces 17a, 17b that are positioned such that, when viewed from a longitudinal cross-section, both opposing side-faces 17a, 17b of the adjacent transverse ribs 16a, 16b form an acute angle α between each of the opposing side-faces 17a, 17b and one of the top face 21 and the bottom face 23 of the first housing 112a. Opposing side-faces 18a and 18b of the next two consecutive, adjacent ribs 16b, 16a, respectively, (i.e., such that opposing side-faces 17b and 18a are located on opposite side-faces of rib 16b) form an acute angle α with the top face 21 of the first housing 112a.

On the opposite face of the first housing 112a both opposing side-faces 17a, 17b of adjacent transverse ribs 16a, 16b form an obtuse angle β between each of the opposing side-faces 17a, 17b and said opposite face. Opposing side-faces 18a and 18b of the next two consecutive, adjacent ribs 16b, 16a, respectively, form an obtuse angle β with the opposite face of the first housing 112a. Furthermore, the description provided above with respect to the configuration of the first through fourth openings 26a, 26b, 28a, 28a, is consistent between filtering assemblies 10 and 100. Accordingly, like reference numerals will be used to describe similar features.

Figure 3:
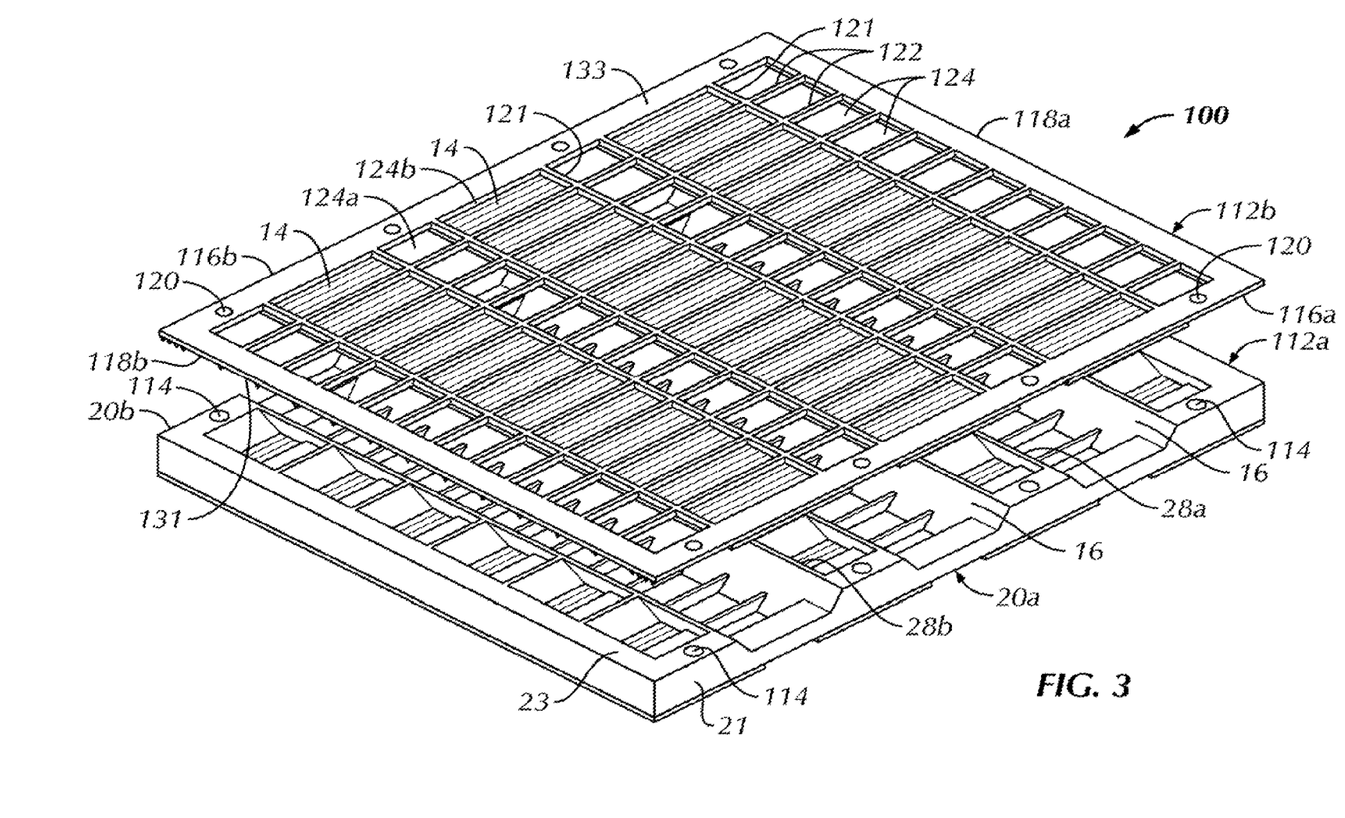
FIG. 3 is an exploded perspective view of another filtering assembly, according to embodiments of the present disclosure.
Figure 4:
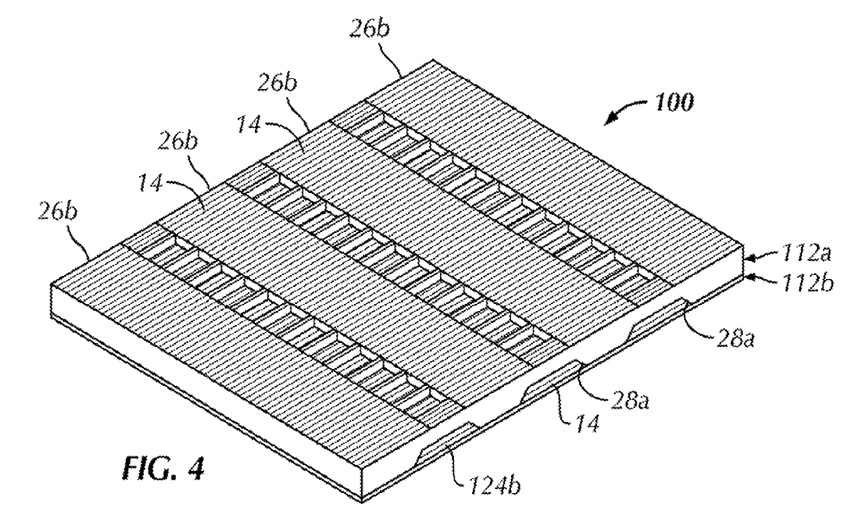
FIG. 4 is an assembled perspective view of the filtering assembly of FIG. 3.
Figure 5:
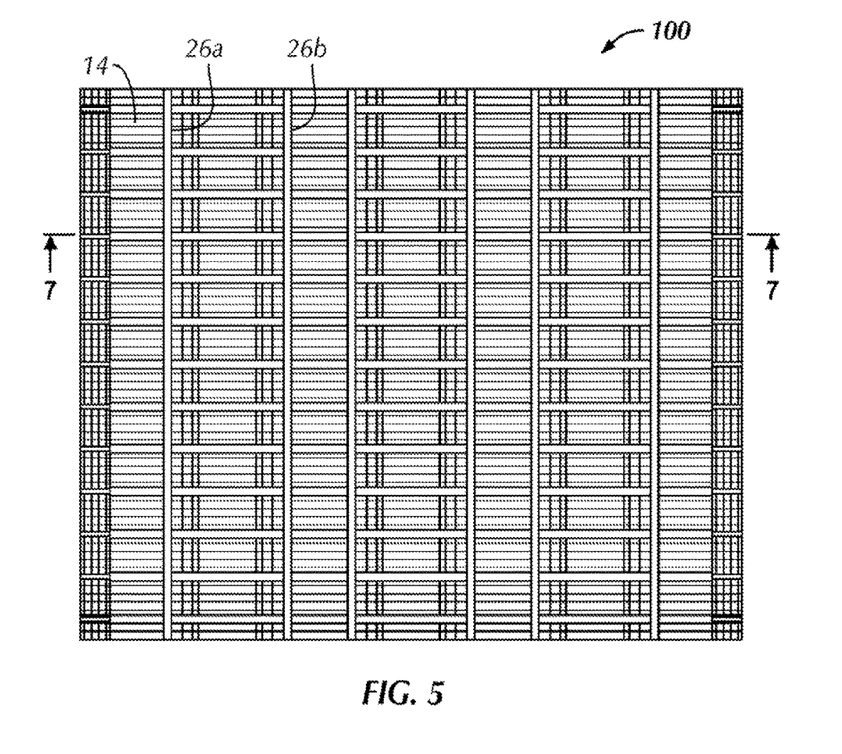
FIG. 5 is a top view of the filtering assembly of FIG. 3.
Figure 6:
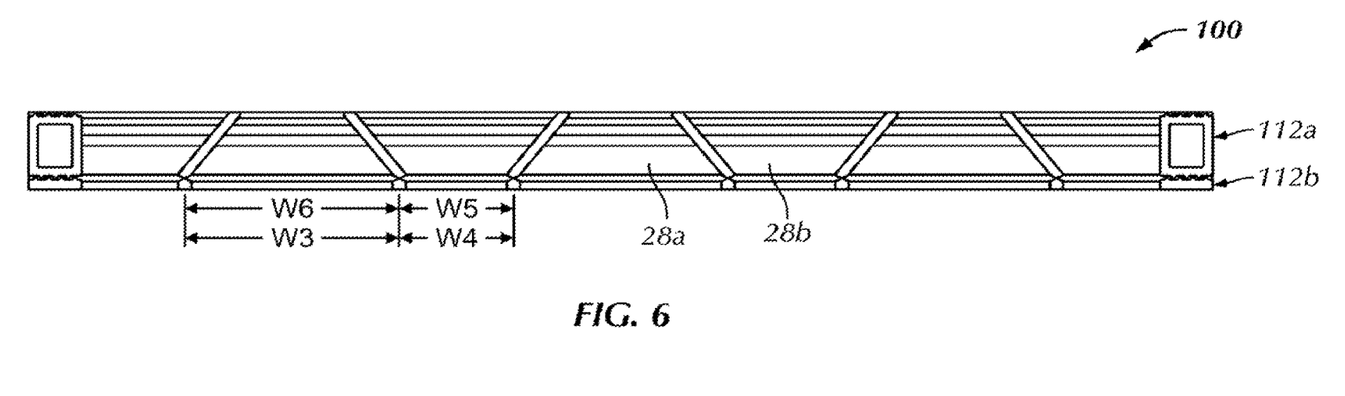
FIG. 6 is a side view of the filtering assembly of FIG. 3.

The first housing 112a may include at least one aperture or bore 114. The bores 114 may be positioned along the sidewalls 20a, 20b and extend from the top face 21 to the bottom face 23 of the first housing 112a. As illustrated, in one configuration the sidewall 20a includes four bores 114 and the sidewall 20b includes four bores 114. The bore configuration is not intended to limit the scope of the present disclosure.

The second housing 112b may include sidewalls 116a, 116b and end walls 118a, 118b. The sidewalls 116a, 116b and end walls 118a, 118b may define a second housing 112b having a length and a width. The housing 112b may also include a top face 131 and a bottom face 133. In one configuration, the size and shape of an outer perimeter of the second housing 112b is generally the same as the size and shape of an outer perimeter of the first housing 112a. The sidewalls 116a, 116b may include at least one aperture or through-bore 120. The quantity of through-bores 120 may be equal to the quantity of bores 114 in the first housing 112a, such that the through-bores 114 of first housing 112a and the through-bores 120 of second housing 112b align, when the second housing 112b is attached to the first housing 112a.

The second housing 112b may include a plurality of transverse beams 121 extending between the sidewalls 116a, 116b and a plurality of longitudinal beams 122 extending between the end walls 118a, 118b. The plurality of transverse beams 121 may be positioned to align with the plurality of transverse ribs 16 of the first housing 112a. The transverse beams 121 may be substantially perpendicular to the longitudinal beams 122, such that the transverse and longitudinal beams 121, 122 define a grid of rectangular openings 124. The transverse beams 121 may be spaced such that a width W5 of a first cell 124a is substantially equal to the width W4 of the fourth opening 28b in the first housing 112a, and a width W6 of a second cell 124b is substantially equal to the width W2 of the second opening 28a in the first housing 112a.

Figure 7:
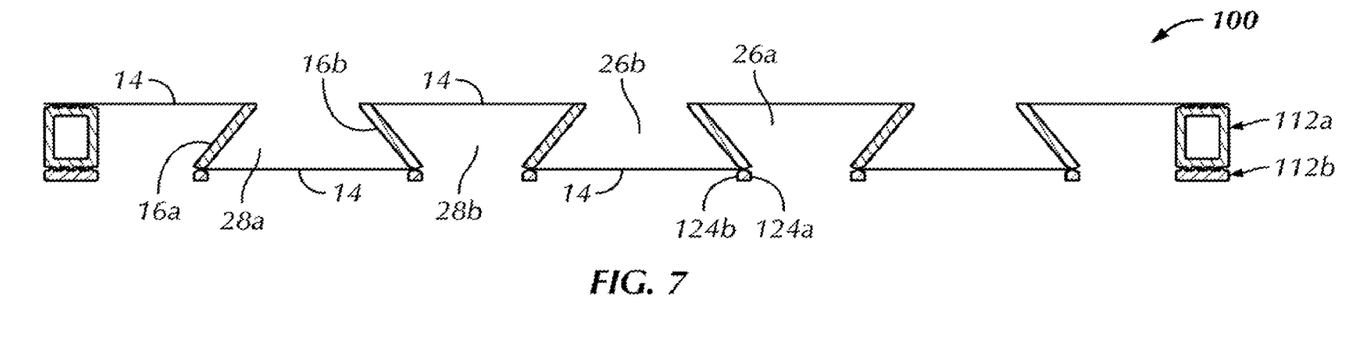
FIG. 7 is a cross-sectional view of the filtering assembly of FIG. 3, taken through the line 7-7 of FIG. 5.

The filtering assembly 100 may be assembled by securing at least one screen segment 14 to the second housing 112b, such that the screen 14 extends between the sidewalls 116a, 116b, and is substantially aligned with the second cell 124b and the second opening 28a of the first housing 112a. The at least one screen segment may be positioned on the top face of the second housing 112b, such that the screen segment 14 is located between the first housing 112a and the second housing 112b. In the assembled configuration, the screen segment 14 may be substantially aligned with the second opening 28a in the first housing 112a, and the through-bores 120 may be substantially aligned with the bores 114. A screw, bolt or other suitable mechanical fastener (not shown) may be positioned within the bores 114 and the through bores 120 to secure the first housing 112a to the second housing 112b, and thereby secure the second screen segment 14b between the first and second housings 112a, 112b.

Figure 8:
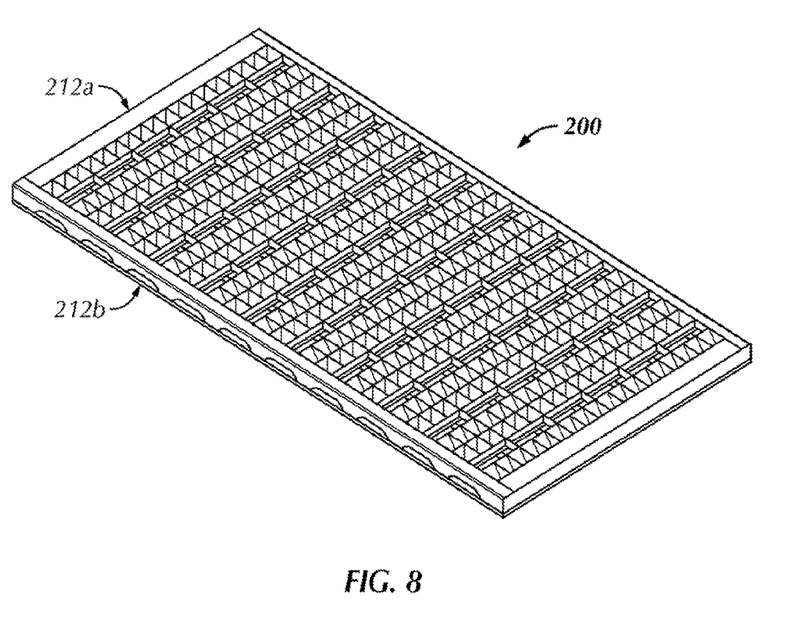
FIG. 8 a perspective view of another filtering assembly, according to embodiments of the present disclosure.
Figure 9:
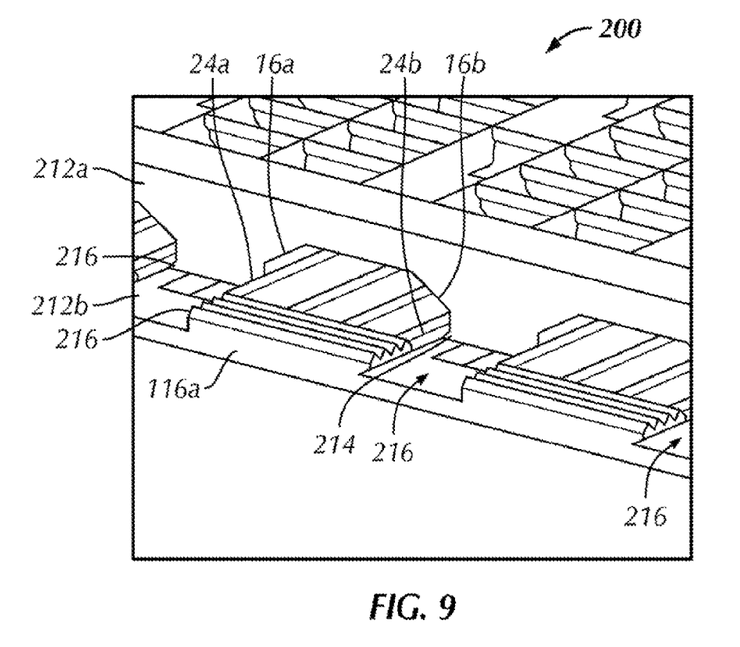
FIG. 9 is a partial perspective view of the filtering assembly of FIG. 8.
Figure 10:
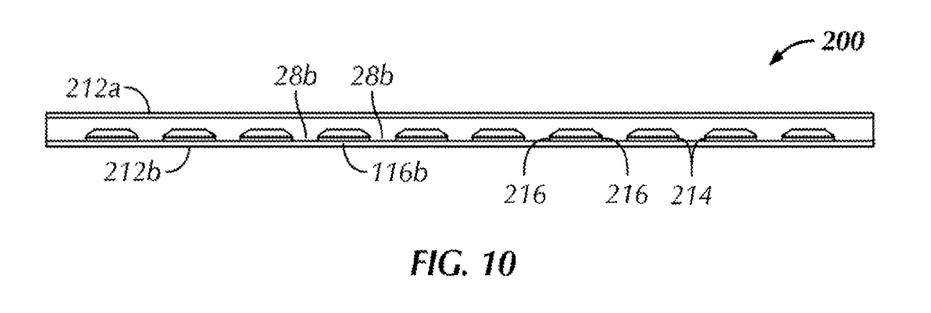
FIG. 10 is a side view of the filtering assembly of FIG. 8.

With reference to FIGS. 8-10, another configuration of a filtering assembly 200 is shown. The filtering assembly 200 includes a first housing 212a and a second housing 212b. The first and second housings 212a, 212b may be similar to the description provided above with respect to first and second housing 112a, 112b. However, in the filtering assembly 200, at least one transverse rib 16 of the first housing 212a may include an extension 214 positioned along a length of a bottom edge 24 of at least one transverse rib 16. The extension 214 may have, for example, a dovetail profile, although other interlocking profiles known in the art may be used without departing from the scope of the present disclosure. The second housing 212b includes a corresponding groove 216 having a profile to receive the extension 214, such that the groove extends between first and second sidewalls 116a, 116b of the second housing 212b. The filtering assembly 200 may be assembled by sliding the extension 214 into the groove 216. As shown in FIGS. 8-10, the first housing 212a includes multiple extensions 214 and the second housing 212b includes multiples grooves 216. Although, the extension 214 and groove 216 is described with respect to the embodiment shown in FIGS. 8-10, one skilled in the art will understand that any embodiment having more than one housing may include an extension 214 and groove 216. Further, one of ordinary skill in the art will appreciate that in some embodiments, the second housing 212b may include the extension 214 and the first housing may include the groove 216.

Figure 11:
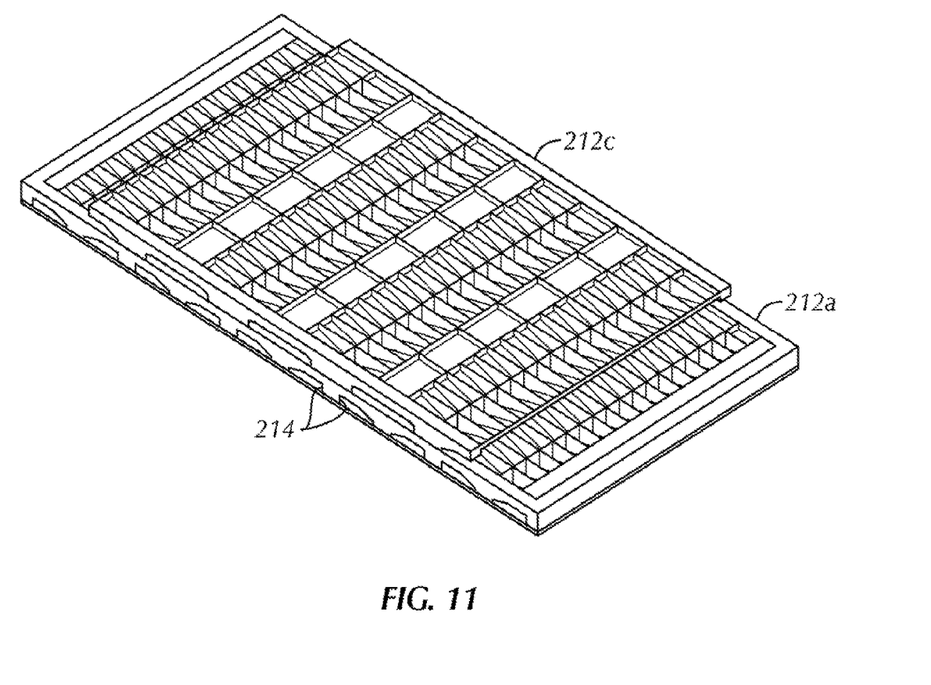
FIG. 11 is a perspective view of another filtering assembly, according to embodiments of the present disclosure.
Figure 12:
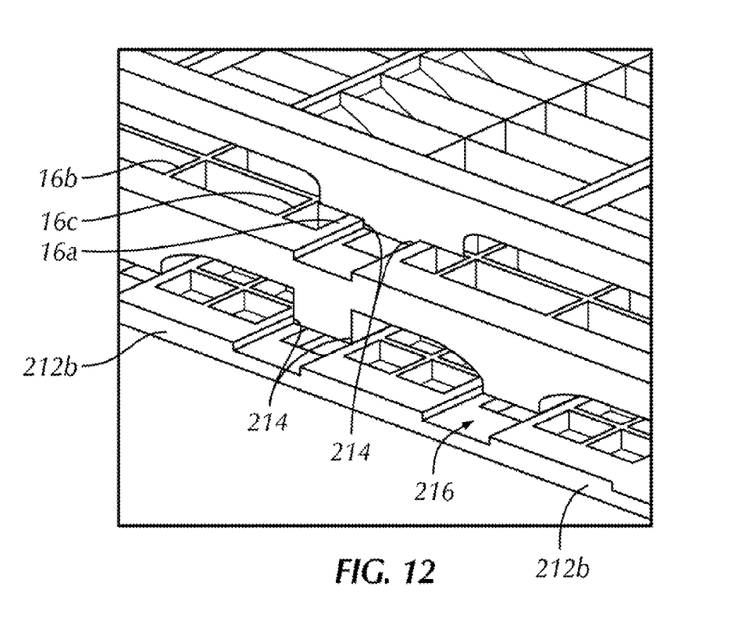
FIG. 12 is a partial perspective view of the filtering assembly of FIG. 11.

While the filtering assembly 200 is generally described herein as including a first housing 212a and a second housing 212b, it will be appreciated that the filtering assembly 200 may include more than two housings 212. With reference to FIGS. 11 and 12, in one configuration, a filtering assembly 200 includes three housings 212a, 212b, 212c. The third housing 212c may have a structure substantially similar to the first housing 112a described with respect to FIGS. 3 and 4. The first housing 212a may be similar to the structure of the first housing 112a, but may further include a third rib 16c. The additional rib 16c may be configured substantially similar to at least one of an adjacent first rib 16a or second rib 16b (see, for example, 16a, 16b, and 16c in FIG. 16).

Figure 13:
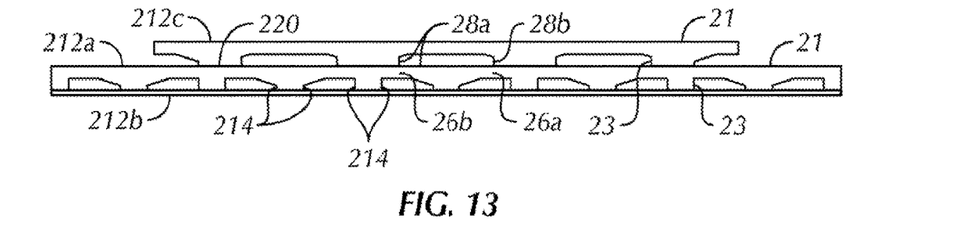
FIG. 13 is a side view of the filtering assembly of FIG. 11.

The first housing 212a and the third housing 212c may be stacked or otherwise positioned such that the top face 21 of the first housing 212a is opposite the bottom face 23 of the third housing 212c. The first housing 212a may be positioned such that a first opening 26a is substantially aligned with a fourth opening 28b of the third housing 212c, and a third opening 26a of the first housing 212a is substantially aligned with a second opening 28a of the third housing 212c. It will be appreciated that the filtering assembly 200 may include more than three housings 212 within the scope of the present disclosure, such that each additional housing has a structure similar to the first housing 212a.

Figure 14:
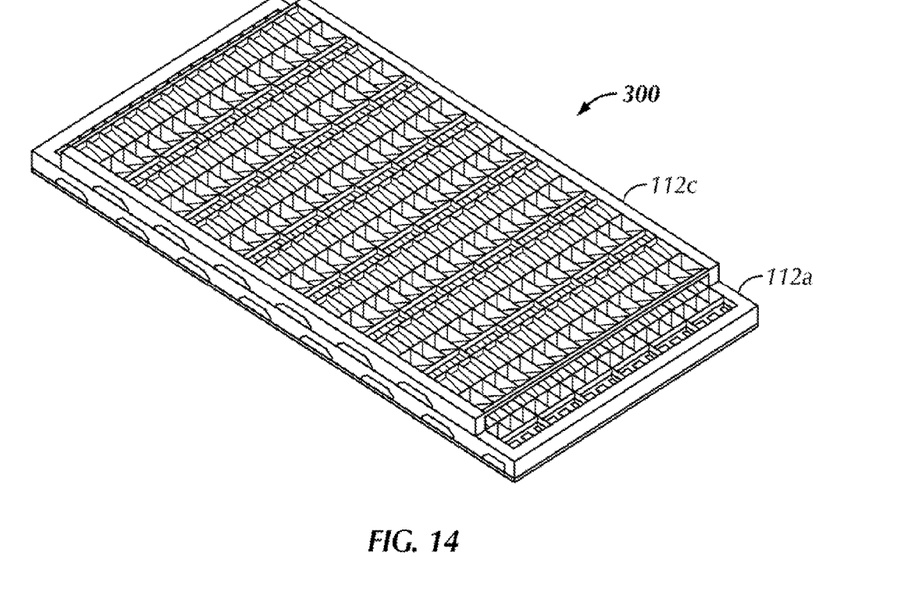
FIG. 14 is a perspective view of another configuration of a filtering assembly, according to embodiments of the present disclosure.
Figure 15:
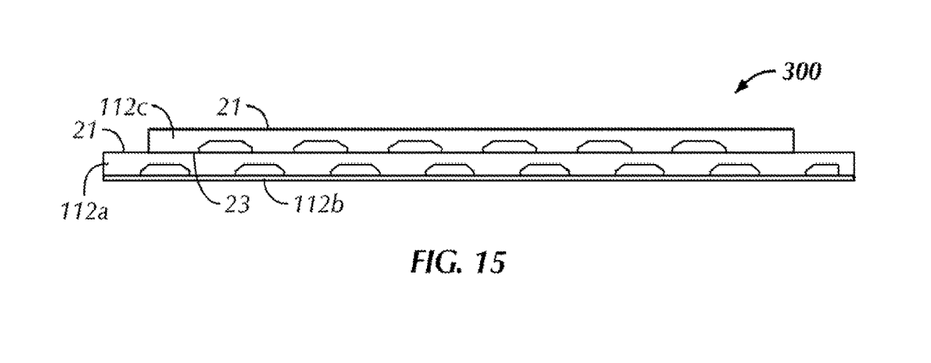
FIG. 15 is a side view of the filtering assembly of FIG. 14.
Figure 16:
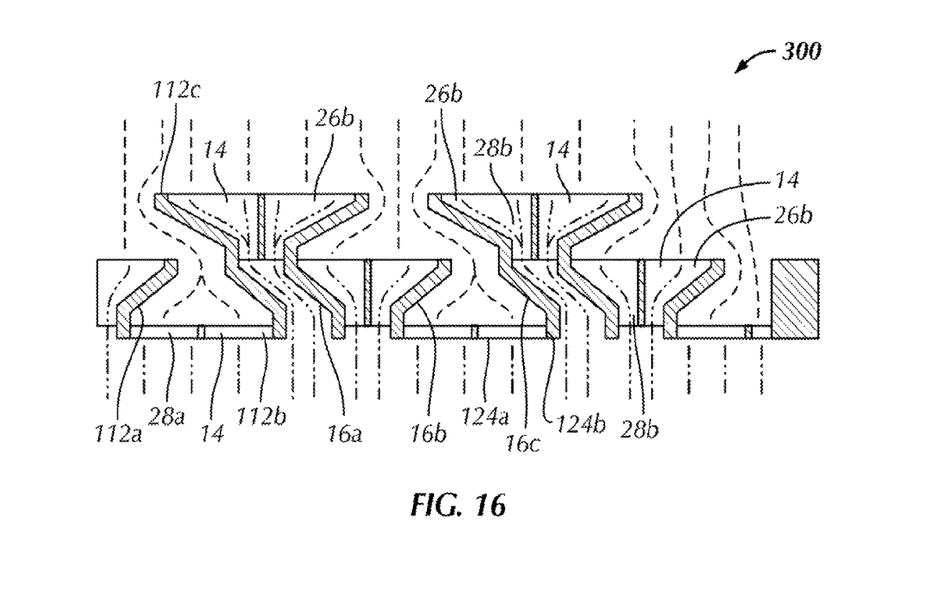
FIG. 16 is a cross-sectional view of the filtering assembly of FIG. 14.

With reference to FIGS. 14-16, another configuration of a filtering assembly 300 is shown. The filtering assembly 300 may be substantially similar to the filtering assembly 100, except as otherwise provided herein. The filtering assembly 300 may include more than two housings 112. In one configuration, the filtering assembly 300 includes three housings 112a, 112b, 112c. It will be appreciated, however, that the filtering assembly 300 may include more or less than three first housings 112 within the scope of the present disclosure. In an assembled configuration, the first housing 112a may be stacked or otherwise positioned such that the top face 21 of the first housing 112a is opposite the bottom face 23 of the third housing 112c. With particular reference to FIG. 16, the first and second housings 112a, 112b may be stacked or otherwise positioned such that a centerline of the second cell 124a in the second housing 112b is offset from a centerline of the fourth opening 28b in the first housing 112a, and a centerline of the second opening 28a in the third housing 112c is offset from both a centerline of the second opening 26b of the first housing 112a and a centerline of the first opening 26a of the lower first housing 112a.

Accordingly, embodiments disclosed herein provide a filtering assembly that increases an effective screening area. Specifically, embodiments disclosed herein include a screen housing having two sidewalls and two end walls, defining a perimeter with a length and a width. The screen housing also includes a top face and a bottom face. A plurality of screen segments may be positioned on the top face of the screen housing, such that the plurality of screen segments on the top face provide a screening surface area less than a total surface area of the top face. The filtering assembly also includes a plurality of screen segments disposed on the bottom face of the screen housing, such that the plurality of screen segments on the bottom face provide a screening surface area less than a total surface area of the bottom face. However, the total screening surface area of the filtering assembly is greater than the total surface area of the top face or the total surface area of the bottom face.

The filtering assembly may further include a plurality of transverse ribs spanning the first width extending from the top face to the bottom face of the screen housing. The plurality of transverse ribs may be arranged such that, adjacent transverse ribs 16a, 16b have opposing side-faces are positioned such that, when viewed from a longitudinal cross-section, both opposing side-faces of the adjacent transverse ribs form an acute angle α between each of the opposing side-faces and one of the top face and the bottom face of the housing. Opposing side-faces of the next two adjacent ribs form an acute angle α with the top face of the housing. On the opposite face of the first housing both opposing side-faces of adjacent transverse ribs form an obtuse angle β between each of the opposing side-faces and said opposite face. Opposing side-faces of the next two adjacent ribs form an obtuse angle β with the opposite face of the housing.

Furthermore, the description provided above with respect to the configuration of the first through fourth openings 26a, 26b, 28a, 28a, is applicable to the above described arrangement of transverse ribs. Further, the filtering assembly may include more than one housing without departing from the scope of the present disclosure. For example, vibratory separators using screen surfaces described herein may have a single screen deck in certain embodiments. Particularly, older vibratory separators may be retrofitted with the screen surfaces described herein to increase the effective processing capacity. For example, shakers used on offshore platforms, where space on the rig floor is at a premium, may be retrofitted with the screen surfaces according to this disclosure to increase the effective screening area. Likewise, the first screen surfaces may be used on shakers located at landbased rigs. In other embodiments, vibratory separators using the plurality of screen surfaces may have multiple screening decks and multiple screening surfaces. In certain embodiments, the vibratory separator may include a first screening deck, such as a top screening deck, with a first screen, and a second screening deck, such as a bottom screening deck, with a second screen positioned beneath the top screening deck. Further, those of ordinary skill in the art will appreciate that other screening decks, such as a third and/or a fourth screening deck, may be included within the vibratory separator without departing from the scope of the present disclosure. These arrangements are useful in methods of treating fluids.

In another aspect, embodiments disclosed herein may include a screen housing having two sidewalls and two end walls, defining a perimeter with a length and a width, a top face and a bottom face. The screen housing may further include a first pair of ribs disposed within the perimeter, spanning the width of the screen housing and each rib extending from the top face to the bottom face of the screen housing. The first pair of ribs may define a first opening located on the top face of the screen housing located between a first rib and a second rib of the first pair of ribs. The first pair of ribs may also define a second opening located on the bottom face of the screen housing located between the first rib and the second rib of the first pair of ribs, wherein a width of the first opening is different from a width of the second opening.

Accordingly, filtering assemblies described herein may filter a fluid once. For example, with reference to FIG. 3, fluid provided to filtering assembly 10 may be filtered by a screen segment 14 located on a top face 21 or a bottom face 23. For example, fluid may be filtered by the screen segment 14 disposed across the third opening 26*b* and exit the filtering assembly through the fourth opening 28*b*. Fluid that bypasses the third opening 26*b* may be filtered by the screen segment 14 disposed across the second opening 28*a* and exit the filtering assembly.

Filtering assemblies provided with more than two screening levels may also filter a fluid once. For example, with reference to FIG. 16, fluid provided to filtering assembly 16 may be filtered by screen segment 14 disposed across the third opening 26*b* of the third housing 112*c*. Fluid that bypasses the screen segment 14 disposed in the third housing 112*c* may be filtered by a screen segment 14 disposed across the third opening 26*b* of the first housing 112*a*. Fluid that bypasses both the third housing 112*c* and the first housing 112*a* will be filtered by screen segment 14 disposed in the second opening 28*a* of the second housing 112*b*.

Filtering assemblies disclosed herein may be manufactured by forming a first screen housing having two first sidewalls and two first end walls, which define a first perimeter. The first screen housing has a first length and a first width, a top face, and a bottom face, and at least one pair of ribs spanning a width of the first screen housing. Once the screen housing is formed, a first screen segment may be attached between a first rib and second rib of each pair of ribs on at least one of the top face or the bottom face of the screen housing. Next, a second screen segment may be attached between the at least one pair of ribs and an adjacent pair of ribs the screen housing and/or the two first sidewalls on a at least one of the top face or the bottom face of the screen housing, such that the top face and the bottom face each have a first or second screen segment disposed thereon. Screen segments may be attached to the screen housing as separate discrete segments or a screen spanning the first length and width of the screen housing may be attached to the screen housing, and the first and screen segments may be cut out from the screen. One skilled in the art will understand that the aforementioned method may be modified in view of the various embodiments disclosed herein, for example, the method may be expanded to include forming a second housing.

In some embodiments, screens as disclosed herein may be used in methods of treating fluids, where the screens are positioned in a vibratory separator at or near the feed end of the separator while a single level or conventional screen is disposed proximate the discharge end of the separator. The screening surfaces may also be placed adjacent one another and have staggered relative heights. One of ordinary skill in the art will appreciate that, depending on the configuration of a given vibratory separator, one or more two-tier (or multi-tier) screens may be used in various positions on one or more decks off the vibratory separator.

Embodiments of the present disclosure provide a shaker screen with an increased open screening area, and thus greater overall fluid capacity. The increased screening area may improve fluid capacity of the screen. For example, for a screen that has 5.5 square feet of non-blanked area, a screen in accordance with this disclosure may increase the non-blanked area by 40% to 7.7 square feet or by 60% to 8.8 square feet. In a shaker with four screens, this would provide an increase of 8.8 square feet from 22 to 30.8 square feet or 13.2 square feet to 35.2 square feet. One of ordinary skill in the art will appreciate that the screening area of a screen as disclosed herein may increase by any other amount, including less than 40 percent, greater than 60 percent or between 40 and 60 percent based on the configuration of the screen. The horizontal screening surfaces may have a higher effective screening area and allow more fluid to pass through, thereby providing increased effective processing capacity of the screen.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A filtering assembly comprising:
a screen housing having two sidewalls and two end walls, defining a perimeter with a length and a width, a top face and a bottom face;
a plurality of top screen segments disposed on the top face of the screen housing, the plurality of top screen segments on the top face providing a screening surface area less than a total surface area of the top face;
a plurality of bottom screen segments disposed on the bottom face of the screen housing, the plurality of bottom screen segments on the bottom face providing a screening surface area less than a total surface area of the bottom face,
wherein a total screening surface area of the filtering assembly is greater than the total surface area of the top face and the top and bottom screen segments alternate along at least a portion of the length of the screen housing.

2. The filtering assembly of claim 1, wherein the plurality of screen segments disposed on the top face and the bottom face are discrete or non-continuous.

3. The filtering assembly of claim 1, further comprising a plurality of transverse ribs spanning the width of the screen housing and each rib extending from the top face to the bottom face of the screen housing.

4. The filtering assembly of claim 1, further comprising:
a first pair of ribs disposed within the perimeter, spanning the width of the screen housing and each rib extending from the top face to the bottom face of the screen housing,
wherein
the plurality of screen segments disposed on the top face comprises a first opening located on the top face of the screen housing defined by a first rib and a second rib of the first pair of ribs,
the plurality of screen segments disposed on the bottom face comprises a second opening located on the bottom face of the screen housing defined by the first rib and the second rib of the first pair of ribs, and
a width of the first opening is different from a width of the second opening.

5. The filtering assembly of claim 4, further comprising:
a second pair of ribs disposed within the perimeter of the screen housing adjacent the first pair of ribs, the second pair of ribs spanning the width of the screen housing and each rib extending from the top face to the bottom face of the screen housing,
wherein
the plurality of screen segments disposed on the top face comprises a third opening located on the top face of the screen housing defined by a first rib and a second rib of the second pair of ribs,
the plurality of screen segments disposed on the bottom face comprises a fourth opening located on the bottom face of the screen housing defined by the first rib and the second rib of the second pair of ribs, and
a width of the third opening is different from a width of the fourth opening.

6. The filtering assembly of claim 5, wherein
the plurality of screen segments disposed on the top face comprises a fifth opening located on the top surface of the screen housing defined by the second rib of the first pair of ribs and the first rib of the second pair of ribs,
the plurality of screen segments disposed on the bottom surface comprises a sixth opening located on the bottom surface of the screen housing defined by the second rib of the first pair of ribs and the first rib of the second pair of ribs, and
a width of the fifth opening is different than a width of the sixth opening.

7. The filtering assembly of claim 6, wherein the width of the fifth opening is approximately equal to the width of the second opening and the width of the fourth opening.

8. The filtering assembly of claim 6, wherein the width of sixth opening is approximately equal to the width of the first opening and the width of the third opening.

9. The filtering assembly of claim 6, further comprising a first screen segment disposed over the first opening, a second screen segment disposed over the third opening, and a third screen segment disposed over the sixth opening, wherein the first opening is wider than the second opening.

10. The filtering assembly of claim 1, wherein the plurality of screen segments disposed on the top face of the screen housing and the plurality of screen segments disposed on the bottom face of the screen housing provide at least two screening levels of the filtering assembly.

11. The filtering assembly of claim 10, wherein the at least two screening levels of the filtering assembly are arranged such that fluid provided to the filtering assembly is filtered once.

12. The filtering assembly of claim 1, further comprising:
at least one opening provided in the bottom face of the screen housing, wherein at least one screen segment of the plurality of screen segments on the top face substantially covers the at least one opening formed in the bottom face.

13. The filtering assembly of claim 1, further comprising:
a plurality of openings provided in the bottom face of the screen housing, wherein the plurality of screen segments disposed on the top face substantially cover the plurality of openings provided in the bottom face.

14. A filtering assembly comprising:
a screen housing having two sidewalls and two end walls, defining a perimeter with a length and a width, a top face and a bottom face;
a plurality of screen segments disposed on the top face of the screen housing, the plurality of screen segments on the top face providing a screening surface area less than a total surface area of the top face;
a plurality of screen segments disposed on the bottom face of the screen housing, the plurality of screen segments on the bottom face providing a screening surface area less than a total surface area of the bottom face;
a first opening located on the top face of the screen housing defined by a first pair of ribs; and
a second opening located on the bottom face of the screen housing defined by the first pair of ribs,
wherein a width of the first opening is different from a width of the second opening or a perimeter of the first opening is different from a perimeter of the second opening.

* * * * *